United States Patent
Xu

(10) Patent No.: US 8,262,787 B2
(45) Date of Patent: Sep. 11, 2012

(54) CONFIGURATION OF CONTACTING ZONES IN VAPOR LIQUID CONTACTING APPARATUSES

(75) Inventor: Zhanping Xu, East Amherst, NY (US)

(73) Assignee: UOP LLC, Des Plaines, IL (US)

( * ) Notice: Subject to any disclaimer, the term of this patent is extended or adjusted under 35 U.S.C. 154(b) by 230 days.

(21) Appl. No.: 12/796,824

(22) Filed: Jun. 9, 2010

(65) Prior Publication Data

US 2011/0305616 A1   Dec. 15, 2011

(51) Int. Cl.
*B01D 47/00* (2006.01)
*B01D 53/14* (2006.01)
*B01D 47/14* (2006.01)

(52) U.S. Cl. ............... 96/243; 96/290; 96/322; 95/187; 95/199; 95/223; 95/211

(58) Field of Classification Search ................ None
See application file for complete search history.

(56) References Cited

U.S. PATENT DOCUMENTS

| | | | |
|---|---|---|---|
| 4,014,983 A | | 3/1977 | Hardison |
| 4,325,782 A * | | 4/1982 | Grunewald et al. ............ 568/913 |
| 4,853,012 A * | | 8/1989 | Batteux et al. .................. 95/174 |
| 4,968,335 A | | 11/1990 | Fujimoto et al. |
| 5,314,671 A * | | 5/1994 | Elgue et al. .................... 423/220 |
| 5,470,478 A * | | 11/1995 | Leva .............. 210/634 |
| 5,958,191 A * | | 9/1999 | Patel .......................... 202/158 |
| 6,048,513 A * | | 4/2000 | Quarderer et al. ............ 423/473 |
| 6,800,120 B1 * | | 10/2004 | Won et al. ....................... 96/234 |
| 7,056,482 B2 | | 6/2006 | Hakka et al. |
| 7,083,662 B2 | | 8/2006 | Xu et al. |
| 7,147,691 B2 | | 12/2006 | Palmer |
| 7,485,274 B2 | | 2/2009 | Kamijo et al. |
| 7,601,315 B2 * | | 10/2009 | Ouimet ......................... 423/228 |
| 7,604,724 B2 | | 10/2009 | Mortson |
| 2004/0060334 A1 | | 4/2004 | Palmer |
| 2004/0200353 A1 * | | 10/2004 | Bras et al. ....................... 95/211 |
| 2007/0137482 A1 | | 6/2007 | Xu et al. |
| 2008/0210092 A1 | | 9/2008 | Buckles et al. |
| 2009/0151562 A1 | | 6/2009 | Russell et al. |
| 2009/0158930 A1 * | | 6/2009 | Wagner et al. .................. 95/179 |
| 2010/0135885 A1 * | | 6/2010 | Patterson et al. .......... 423/245.2 |
| 2011/0120308 A1 * | | 5/2011 | Dube et al. ..................... 95/199 |
| 2011/0239862 A1 * | | 10/2011 | Davydov ........................ 95/151 |

* cited by examiner

*Primary Examiner* — Duane Smith
*Assistant Examiner* — Pankti Patel
(74) *Attorney, Agent, or Firm* — Mark Goldberg

(57) ABSTRACT

Vapor-liquid contacting apparatuses comprising a primary contacting zone and a secondary contacting zone are disclosed. A representative secondary contacting zone is a secondary absorption zone, such as a finishing zone for subsequent contacting of the vapor effluent from the primary contacting zone to further remove impurities and achieve a desired purity of purified gas exiting the secondary absorption zone. The secondary contacting zone is disposed below the primary contacting zone, such that the secondary contacting zone, which must operate efficiently in removing generally trace amounts of remaining impurities, is more protected from movement than the more elevated, primary or initial contacting stages for bulk impurity removal. The apparatuses are therefore especially beneficial in offshore applications where they are subjected to rocking.

7 Claims, 2 Drawing Sheets

CONFIGURATION OF CONTACTING ZONES IN VAPOR LIQUID CONTACTING APPARATUSES

FIELD OF THE INVENTION

The invention relates to vapor-liquid contacting apparatuses having primary and secondary contacting zones such as absorption zones, with the secondary absorption zone disposed below the primary absorption zone, especially for improved performance in offshore applications.

DESCRIPTION OF RELATED ART

A significant objective throughout chemical and refining technologies is the improved efficiency of contacting between vapor and liquid phases. Currently, there are a wide variety of multi-phase reaction and separation processes which can benefit from an enhanced rate of vapor-liquid mass and/or heat transfer by increasing the interfacial area and turbulence between the contacting phases and thereby raising the mass transfer rate constant. These processes typically employ any of a wide range of conventional vapor-liquid contacting devices. Such devices include fractionation trays and packings that improve vapor-liquid contacting at discreet stages or over a continuous section within a vessel. These devices may be used, for example, in the selective absorption, into the liquid phase, of impurities contained in the vapor phase. Other commercially significant applications for these contacting devices include distillation processes for separating components, into either the rising vapor phase or falling liquid phase, depending on their relative volatility.

In the art of gas processing, numerous industrial gas streams are treated to remove acid gas contaminants that would otherwise be released into the environment as harmful and polluting emissions. Acid gases that are desirably removed include the hydrogen halides (HCl, HBr, HF, and HI), hydrogen sulfide ($H_2S$), sulfur oxides (e.g., $SO_2$ and $SO_3$), nitrogen oxides (e.g., NO and $NO_2$), and chlorine ($Cl_2$). These acid gases originate from a wide variety of operations, for example as combustion (oxidation) products, chemical reaction byproducts, and process additive conversion products. In the case of natural gas extracted from currently developed gas fields, the valuable methane is normally contaminated with $CO_2$, $H_2S$, and other impurities. When combined with water, $CO_2$ creates carbonic acid which is corrosive. This contaminant also reduces the BTU value of the gas and even renders the gas unmarketable when present in concentrations as little as 2-3% by volume. Also, $H_2S$ is an extremely toxic gas that is highly corrosive as well.

The removal of $CO_2$ and $H_2S$ from "sour" natural gas containing predominantly methane is therefore necessary to improve its quality to meet "sweet" gas standards of the purified gas for pipeline transmission, sale, and end use. If the purified gas is not located near a pipeline, it is generally subjected to liquefaction, and this application similarly requires $CO_2$ and $H_2S$ from the impure natural gas. Liquid solvent absorption (i.e., "wet") systems, for example, are commonly used for preferential reaction or absorption of the unwanted contaminants into chemical solvents or physical solvents. Chemical solvents react chemically with the selectively dissolved product, whereas physical solvents do not react. Physical solvents instead promote physical absorption of an impurity based on its high equilibrium solubility at its partial pressure in an impure mixture (i.e., a higher Henry's law constant). Chemical solvents include organic amines such as alkanolamines (e.g., monoethanolamine (MEA), methyldiethanolamine (MDEA), and diethanolamine (DEA)) and alkali metal salts. Physical solvents include dimethylethers of polyethylene glycol, propylene carbonate, tributyl phosphate, methanol, tetrahydrothiophene dioxide (or tetramethylene sulfone). The solvent absorption (and also the solvent regeneration, for example, by heating in the case of a physical absorbent) are usually carried out in columns containing packing, bubble plates, or other vapor-liquid contacting devices, as discussed above, to improve the efficiency of mass transfer between phases.

Conventional systems based on absorption columns containing packing materials or trays, however, have a number of shortcomings. For example, mass transfer rates between the vapor and liquid phases in these columns are relatively low, meaning that a large number theoretical equilibrium stages of contacting are required in many cases to achieve a given level of performance (e.g., gas product purity). Compactness is therefore a difficult objective. Also, the absorption is normally exothermic, especially in acid gas absorption by amines. Areas of poor flow distribution within the column can therefore cause local overheating of the solvent. This leads to losses in absorption efficiency and even boiling off of the contaminants that would otherwise be desirably absorbed into the liquid phase.

The need for good flow distribution and contacting efficiency is particularly important when the vapor-liquid absorption, or other operation requiring a tall column having multiple contacting stages and an associated, large solvent inventory, is located offshore. When the column is installed on a floating vessel or platform for gas processing, its performance can be significantly decreased by horizontal rocking or other movement that causes fluid maldistribution. Moreover, this problem is magnified at the higher column elevations conventionally used for the final purification or "finishing" operation to absorb trace remaining contaminants such as acid gases. The high purity level required of the rising vapor, which is ultimately recovered as purified gas from a top contacting stage of the vessel, may therefore be compromised. The decrease in vapor-liquid contacting efficiency, particularly in upper column regions, due to motion is not easily addressed without presenting other problems. For example, a proposed alternative of merely replacing a single column with two smaller, side-by-side columns having inter-column pumping increases the "footprint" or construction area, which is limited and therefore costly on an off-shore platform.

Improvements in vapor-liquid contacting apparatuses, and particularly those for the treatment of natural gas to remove acid gas components, are continually being sought. Particularly desired in industry are such gas purification systems having improved efficiency of mass and heat transfer. Such systems should also be economical in terms of solvent inventory and physical space, both of which must be minimized in offshore applications.

SUMMARY OF THE INVENTION

The present invention is associated with vapor-liquid contacting apparatuses comprising a primary contacting zone and a secondary contacting zone. A representative primary contacting zone is a primary absorption zone for initial contacting of an impure gas with a fresh absorbent for bulk removal of impurities such as acid gases. A representative secondary contacting zone is a secondary absorption zone, such as a finishing zone for subsequent contacting of the vapor effluent from the primary contacting zone to further remove impurities and achieve a desired purity of gas exiting the secondary absorption zone. Subsequent contacting in the secondary absorption zone may represent an intermediate contacting step, although it is often a final purification to achieve the desired purity. Advantageously, the secondary contacting zone is disposed or positioned below the primary contacting zone, such that the secondary contacting zone, which must operate efficiently in removing what are normally trace amounts of remaining impurities from the vapor phase, is more protected from movement than the primary or initial contacting zone, which is positioned at a higher elevation and used for bulk impurity removal.

A particular application is in the use of primary and secondary absorption zones for the purification of impure gases, for example, sour natural gas obtained from a gas field. This gas generally comprises predominantly methane and further comprises both $CO_2$ and $H_2S$. In a preferred embodiment, this impure gas is subjected to primary and secondary absorption in apparatuses, and according to methods, as described herein to achieve a high purity. Representative purity levels are of less than 100 ppm by volume, of combined acid gases $CO_2$ and $H_2S$, or less than 50 ppm of $CO_2$, in the purified gas exiting in a gas product outlet of the secondary absorption zone. In the case of natural gas purification, the content of $CO_2$ and $H_2S$ following primary or bulk absorption is generally from about 0.5% to about 3% by volume, as contained in the primary absorption zone vapor outlet, prior to passing to the vapor inlet of the secondary absorption zone. The liquid absorbent used in the vapor-liquid contacting may be a chemical solvent such as an organic amine (e.g., an alkanolamine).

Other processes that can benefit from the vapor-liquid contacting apparatuses and methods described herein include any of those, such as distillation, that conventionally rely on fractionation trays and packings to improve vapor-liquid contacting at a plurality of stages within a vessel. Overall embodiments of the invention are therefore directed to vapor-liquid contacting apparatuses, and methods for using the apparatuses, comprising a primary (or bulk) contacting zone and a secondary (or finishing) contacting zone disposed below the primary contacting zone. The primary and/or secondary contacting zone(s) may comprise a plurality of contacting stages, such as vertically spaced-apart trays or contacting modules, or may comprise other vapor-liquid contacting devices including packing material (e.g., rings, discs, saddles) in a continuous packed section. The ability to improve contacting efficiency under conditions of motion, such as in the case of offshore operation, advantageously allows the total length of the primary and second absorption zones (e.g., which may both be housed or contained within a single vertically oriented vessel to be reduced for a given performance level (e.g., degree of acid gas removal).

These and other embodiments relating to the present invention are apparent from the following Detailed Description.

Figure 1:
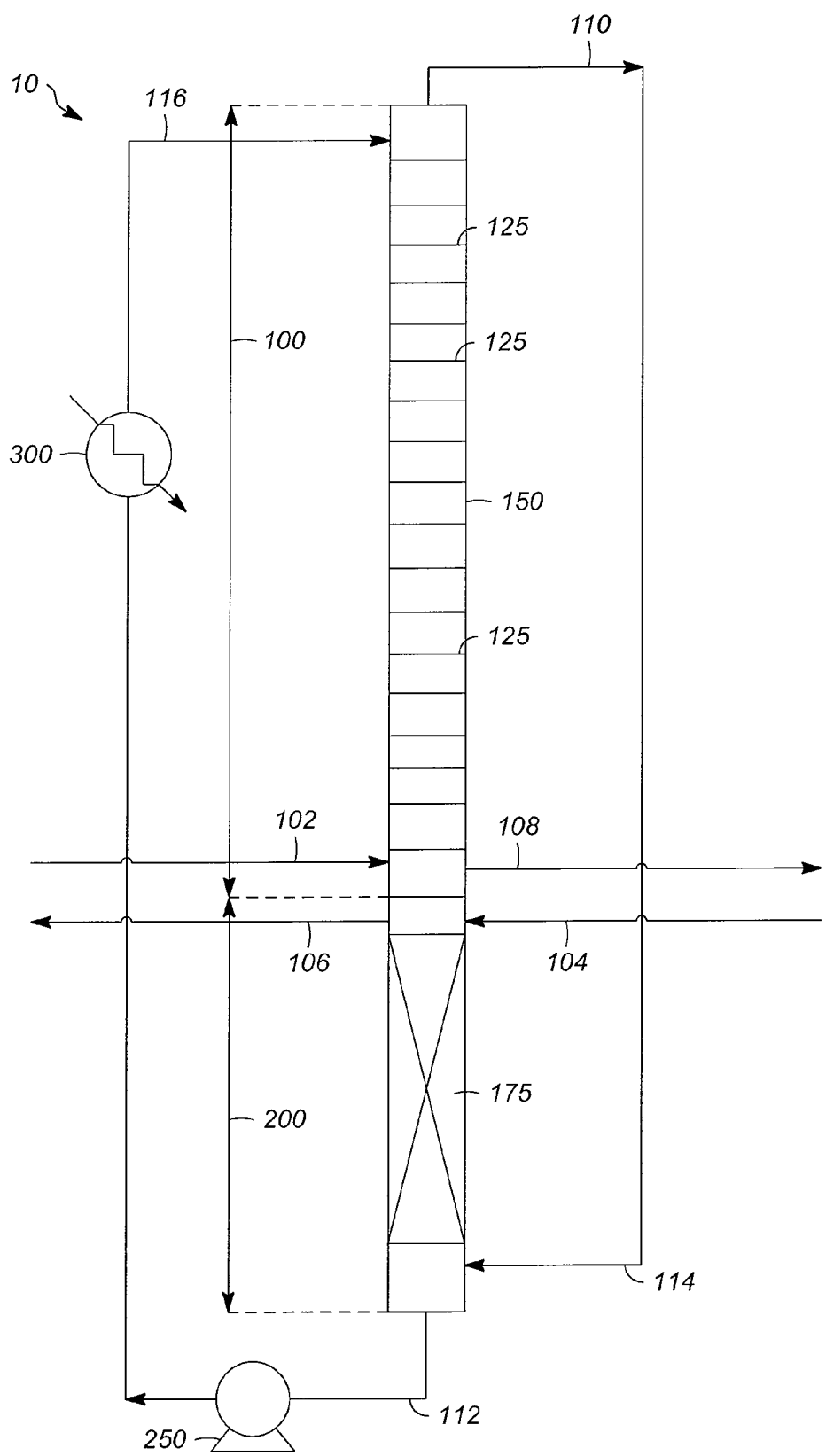
FIG. 1 is a side view of a representative vapor-liquid contacting apparatus with a primary absorption zone comprising a plurality of contacting stages and a secondary absorption zone comprising a packed section and disposed below the primary absorption zone.

The same reference numbers are used to illustrate the same or similar features throughout the drawings. The drawings are to be understood to present an illustration of the invention and/or principles involved. As is readily apparent to one of skill in the art having knowledge of the present disclosure, apparatuses comprising primary and secondary contacting zones according to various other embodiments of the invention will have configurations and components determined, in part, by their specific use.

DETAILED DESCRIPTION

Embodiments of the invention are directed to vapor-liquid contacting apparatuses comprising a primary contacting (e.g., primary absorption) zone and a secondary contacting (e.g., secondary absorption) zone disposed below the primary contacting zone. In the absorption of contaminants, such as acid gases (e.g., $CO_2$, $H_2S$, sulfur oxides, and nitrogen oxides), from an impure gas (e.g., natural gas comprising predominantly methane), the primary absorption zone can achieve the bulk or main removal of these contaminants, while the secondary absorption zone can serve as a "finishing" or "polishing" zone to more completely purify the impure gas. The apparatuses and methods of vapor and liquid contacting described herein may be used in any vapor-liquid contacting application, and especially offshore applications, for example, when installed on a floating vessel or platform. In such cases, vapor-liquid contacting is susceptible to inefficiencies resulting from horizontal motion of the apparatus (e.g., a column with one or more sections having packing, trays, or other contacting devices), which is typically oriented (e.g., has a cylindrical axis) in the vertical direction. Improved contacting efficiency and associated performance gains are achieved by better protecting the secondary contacting zone against the effects of horizontal movement, in particular by disposing this zone at a height below the primary contacting zone.

Aspects of the invention are therefore associated with the discovery of vapor-liquid contacting apparatuses having a number of advantages, as discussed above, in terms of their performance as well as their compactness, for example in terms of their footprint (i.e., such that they do not require an excessive installation surface on a floating vessel or platform). The cut-out, side view of FIG. 1 generally illustrates liquid and vapor flows to, between, and from a primary absorption zone 100 and secondary absorption zone 200 of a representative vapor-liquid contacting apparatus 10. According to this embodiment, secondary absorption zone 200 is disposed completely below primary absorption zone 100. In other embodiments, the secondary contacting (e.g., secondary absorption) zone may be disposed below the primary contacting (e.g., primary absorption) zone if a portion of the secondary contacting zone extends below the bottom of the primary contacting zone or below the point at which an inlet enters the primary contacting zone.

The primary absorption zone 100 is in the form of an upper absorption column and comprises, for example packing material or a plurality of trays to improve the efficiency of vapor-liquid contacting in this zone. Primary absorption zone 100 and secondary absorption zone 200, as shown in FIG. 1, can be contained within a single vertically oriented vessel 150 of a constant cross-sectional diameter such that primary and secondary absorption zones 100, 200, define upper and lower absorption columns, respectively, as cylindrical sections within the vessel 150. Primary and secondary absorption zones 100, 200 may therefore have a common vertical axis. Otherwise, separate vessels may be used to contain the different absorption zones. According to various embodiments, the absorption zones may have differing cross sectional areas and/or shapes, or the cross sectional areas and/or shapes may vary over the axial height of one or both absorption zones.

Likewise, the axial lengths, or vertical heights, of the primary and secondary absorption zones 100, 200 may vary depending on the particular application and performance objectives. Generally, the secondary absorption zone, when acting as a finishing zone, has a vertical height that is less than that of the primary absorption zone (i.e., the primary absorption zone has a vertical height that is greater than that of the secondary absorption zone). In various embodiments, the vertical height of the secondary absorption zone is less than about 50% (e.g., from about 10% to about 50%), less than about 40% (e.g., from about 15% to about 40%), less than about 25%, or even less than about 15%, of the combined vertical height of the primary and secondary absorption zones, or the total height of a vertically oriented vessel containing these zones. Consequently, the secondary absorption zone, regardless of whether it contains packing material in a continuous packed section, vertically spaced-apart trays, or other vapor-liquid contacting devices, generally achieves fewer theoretical stages of vapor-liquid equilibrium contacting than the primary absorption zone, which may be packed with vapor-liquid contacting devices of the same or a different type as those contained in the primary absorption zone. In representative embodiments, the number of theoretical stages of vapor-liquid equilibrium contacting in the primary absorption zone ranges from about 10 to about 250, and the number of these stages in the secondary absorption zone, expressed as a percentage of the number in the primary absorption zone, is as discussed above with respect to the percentages of the vertical height of the secondary absorption zone with respect to the primary absorption zone.

As shown in the embodiment of FIG. 1, both of the primary and secondary absorption zones 100, 200 have (i) separate vapor phase and liquid phase inlets and (ii) separate vapor phase and liquid phase outlets. Vapor (gas) phase inlets to, and liquid phase outlets from, a given absorption zone generally communicate with a lower section of that zone, whereas vapor (gas) phase outlets from, and liquid phase inlets to, a given absorption zone generally communicate with an upper section of that zone. Gas feed inlet 102 and liquid feed inlet 104 may be used to convey, respectively, to apparatus 10, (i) an impure gas, for example having an undesirable level of one or more contaminants, and (ii) fresh absorbent, for example comprising a component that selectively reacts with or dissolves any of these contaminants of the impure gas.

Likewise, gas product outlet 106 and liquid product outlet 108 may be used to convey, respectively, from apparatus 10, (i) purified gas, for example having a reduced concentration of any of these contaminants, and (ii) spent absorbent (solvent) following the absorption of any of these contaminants. Fresh absorbent (solvent) therefore refers to absorbent entering apparatus 10 and having at least some capacity for reacting with (in the case of a chemical solvent) or dissolving (in the case in the case of a physical solvent) any of these contaminants of the impure gas. Fresh absorbent may comprise, for example, a make up solution of the component (e.g., an organic amine such as an alkanolamine) or otherwise a combination of a make up solution and a recycled solution that has some reduced capacity relative to the makeup solution. In any event, the fresh absorbent has a reduced amount of any of the reacted or dissolved contaminants, relative to the spent absorbent, and therefore a greater capacity for reacting with or dissolving these contaminant(s).

As illustrated in the embodiment in FIG. 1, gas feed inlet 102 and liquid product outlet 108 both communicate with a lower section (e.g., the bottom) of primary absorption zone 100. Accordingly, impure gas enters primary absorption zone 100 at this lower section, and spent absorbent is removed from primary absorption zone 100 at this lower section. Also, liquid feed inlet 104 and gas product outlet 106 both communicate with an upper section (e.g., the top) of secondary absorption zone 200. Accordingly, fresh absorbent enters secondary absorption zone 200 at this upper section, and purified gas is removed from secondary absorption zone 200 at this upper section. It is not necessary, however, for (i) gas feed inlet 102 and liquid product outlet 108 or (ii) liquid feed inlet 104 and gas product outlet 106 to communicate with primary and secondary absorption zones, respectively, at the same axial or vertical positions, as the terms "upper section" and "lower section," as discussed below, are not limited to this extent.

In addition to the net gas and liquid feeds to, and products from, apparatus 10, intermediate gas and liquid feeds and products are passed between primary and secondary absorption zones 100, 200. These intermediate flows may be routed using absorption zone inlets, outlets, and connecting conduits contained within vertically oriented vessel 150 that also contains the absorption zones, or otherwise they may be partially or completely external to this vessel. The use of additional equipment such as pumps, compressors, and/or heat exchangers in connection with these intermediate flows, however, may require at least some external portions of connecting conduits.

With respect to the particular embodiment of FIG. 1, both primary absorption zone vapor outlet 110 and secondary absorption zone liquid outlet 112 each communicate with both an upper section of primary absorption zone 100 and a lower section of secondary absorption zone 200. In the case of primary absorption zone vapor outlet 110, communication with the lower section of secondary absorption zone 200 is through secondary absorption zone vapor inlet 114. In the case of secondary absorption zone liquid outlet 112, communication with the upper section of primary absorption zone 100 is through primary absorption zone liquid inlet 116. Primary absorption zone vapor outlet 110 and secondary absorption zone vapor inlet 114 are therefore used to convey primary absorption zone vapor effluent from an upper section of the primary absorption zone 100 to a lower section of the secondary absorption zone 200. Secondary absorption zone liquid outlet 112 and primary absorption zone liquid inlet 116 are used to convey secondary absorption zone liquid effluent from a lower section of secondary absorption zone 200 to an upper section of primary absorption zone 100. Preferably, a pump 250 is used to transfer the liquid in this manner to a higher elevation. Also, according to some embodiments, secondary absorption zone liquid outlet 112 may be fluidly connected to a heat exchanger 300, such that secondary absorption zone liquid effluent that is passed through this outlet 112 may be heated or cooled, prior to passing it to upper section of the primary absorption zone 100. Interzone cooling is generally desirable for removal of the heat of absorption that increases the temperature of absorbent exiting the secondary absorption zone, after bulk removal of gas contaminants.

As discussed above, the primary and/or secondary absorption zone(s) may comprise internal contacting devices such as a plurality of contacting stages (e.g., vertically spaced-apart trays or contacting modules) or otherwise packing material in one or more continuous packed sections. A plurality of contacting stages generally provides a number of theoretical stages of vapor-liquid equilibrium contacting in the absorption zones, as discussed above, with the theoretical number being generally less than the actual number of trays, modules, or other discreet, spaced-apart devices used, due to some inefficiencies encountered in practice.

In the embodiment illustrated in FIG. 1, primary absorption zone 100 comprises a plurality of contacting stages 125 that are vertically spaced apart. Spacing is generally at regular intervals but may also be at varying intervals or may otherwise include relatively large spaces in certain vertical sections to accommodate liquid and/or vapor inlet distributors or otherwise liquid and/or vapor outlet collectors, as needed depending on the particular application.

In this regard, it is understood that the description of any inlet or outlet as being "in communication with" or "communicating with" any section or contacting stage of the a contacting or absorption zone 100, 200 does not preclude fluid communication being established through fluid distribution, collection, or other fluid directing devices located between an inlet or outlet and the section or contacting stage. Likewise, in terms of the process, the description of "feeding to," "removing from," "passing to," "passing from," "flowing to," or "flowing from" any section or contacting stage, or the use of similar terms in connection with a section or stage, does not preclude the movement of fluid through a fluid distribution device, a fluid collection device, or other fluid directing device, prior or subsequent to the section or stage. The terms "lower section" and "upper section" of a contacting or absorption zone generally refer to sections containing the bottom 20% and the top 20%, respectively, of axial height of the zone. In the case of contacting or absorption zones comprising contacting stages such as vertically spaced-apart trays or contacting modules, the terms refer to sections containing the bottom 20% and top 20%, respectively, of the stages of the zone.

According to the embodiment of FIG. 1, therefore, both the gas feed inlet 102 and the liquid product outlet 108 from apparatus 10 may communicate with a bottom contacting stage of primary absorption zone 100, while primary absorption zone vapor outlet 110 and secondary absorption zone liquid outlet 112 (through primary absorption zone liquid inlet 116) both communicate with a top contacting stage of primary absorption zone 100. As also illustrated in FIG. 1, secondary absorption zone 200 comprises a continuous packed section 175 that provides a number of theoretical stages of vapor-liquid equilibrium contacting as discussed above.

As in conventional selective absorption or fractional distillation columns, the overall flow between phases in both primary and secondary absorption zones 100, 200 is generally counter-current, with the overall vapor flow in a given zone being upward and the overall liquid in a given zone being downward. Depending on the various types of contacting stages that may be used, however, localized cross flow, co-current flow, or other flow orientations between the phases, during their actual contacting, may be induced. Contacting stages utilizing parallel flow trays, for example, are described in U.S. Pat. No. 5,223,183; U.S. Pat. No. 5,318,732; and U.S. Pat. No. 7,204,477. Those utilizing co-current contacting are described, for example, in U.S. Pat. No. 6,682,633; U.S. Pat. No. 5,837,105; U.S. Pat. No. 6,059,934; and U.S. Pat. No. 7,424,999. The use of an alternative vapor-liquid contacting device, which creates a vortex centrifugal bubbling layer that achieves high interfacial area per unit volume between a vapor and a liquid is described in Kuzmin, A. O. et al., "Vortex centrifugal bubbling reactor" CHEM. ENG. JOURNAL 107: 55-62 (2005) and in Russian Patent RU 2259870. According to preferred embodiments, the primary and/or secondary absorption zones comprise a plurality of vapor-liquid co-current contacting stages, for example those described in U.S. Pat. No. 7,424,999, which is hereby incorporated by reference with respect to its description of such co-current contacting stages. These contacting stages, which cause flows of both of the contacting phases to be in the upward direction during their actual contacting, include at least one but generally a plurality of contacting modules comprising a liquid downcomer having an outlet proximate a co-current flow channel. Generally, the outlet of the liquid downcomer extends between a pair of co-current flow channels. Liquid discharged from a lower part of the downcomer becomes entrained with upflowing vapor, such that both phases are contacted in, and flow through, a co-current flow channel before the resulting liquid and vapor phases, now having different compositions as a result of the contacting, disengage an are separately conveyed, respectively, to the next inferior (lower) and the next superior (higher) contacting stage.

Figure 2:
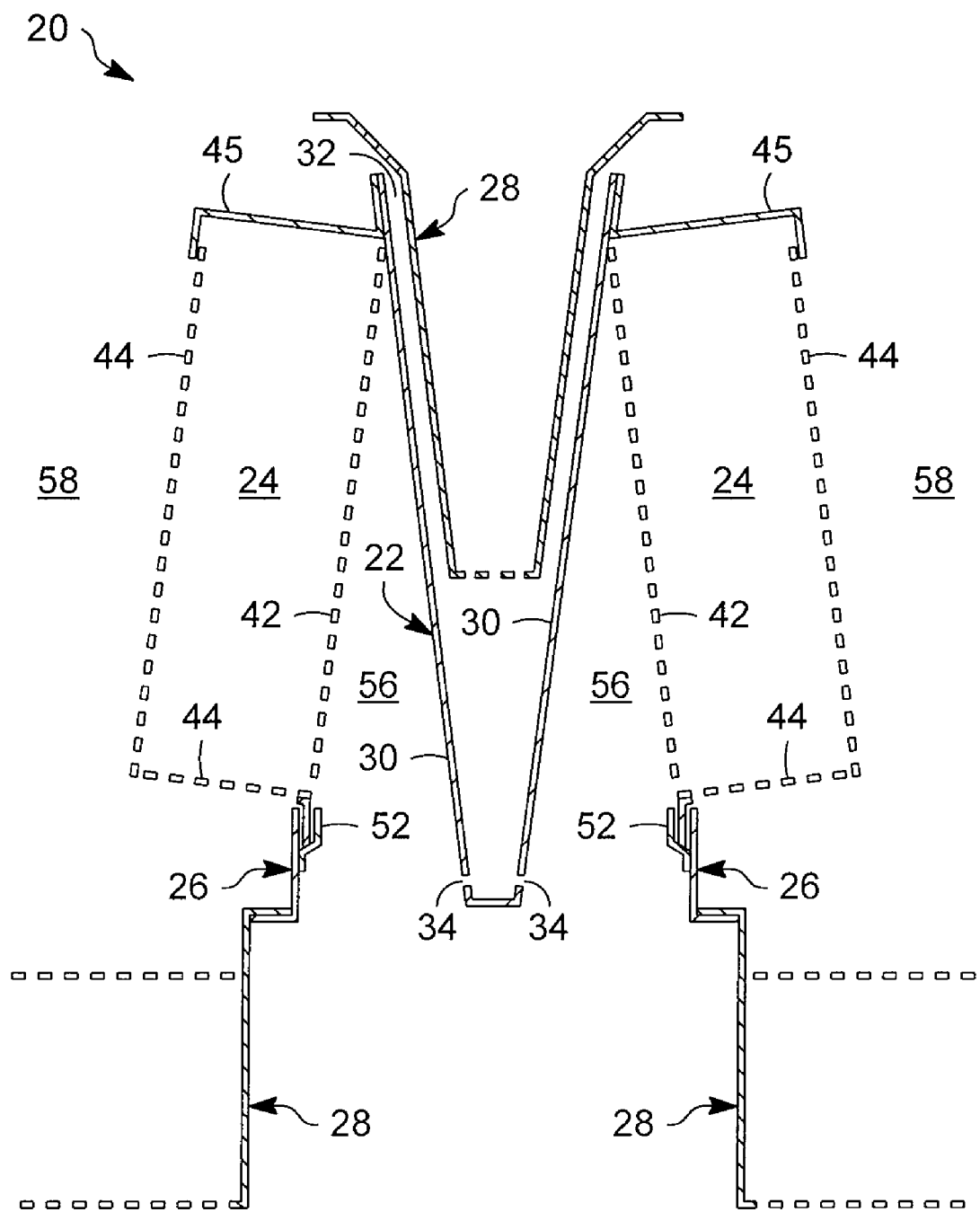
FIG. 2 is a cross-sectional schematic of a representative individual contacting module having co-current flow channels, which may be utilized in contacting stages of the primary and/or secondary absorption zone.

Therefore, one or more of contacting stages 125 of primary absorption zone 100, shown in FIG. 1, may comprise one or more of a representative contacting module 20, as shown in FIG. 2. Otherwise, contacting stages in secondary absorption zone 200 may comprise one or more of these representative contacting modules 20. In particular, the contacting module 20 shown in FIG. 2 includes a liquid distributor or liquid downcomer 22 located between a pair of gas-liquid separators or demisters 24. The liquid downcomer 22 and demisters 24 cooperate to define the co-current fluid contacting volume or co-current flow channel 56. In addition to the contacting modules 20, each stage also includes a plurality of receiving pans 26, with each receiving pan 26 having a plurality of ducts 28. An inlet 32 to the liquid downcomer 22 is configured to engage the ducts 28 of a receiving pan of the immediately superior contacting stage.

According to FIG. 2, liquid downcomer 22 has an inlet 32 in an upper portion and an outlet 34 having one or more outlet openings in a lower portion. Two sloped liquid downcomer walls 30 taper the liquid downcomer 22 in the downward direction. The bottom of the substantially V-shaped liquid downcomer 22 near outlet 34 may be pointed, curved, or flat as shown in FIG. 2. Alternative embodiments having liquid downcomers of various different shapes, such as stepped, or sloped and stepped, are possible. In further embodiments the cross sectional shape of the liquid downcomer may be rectangular (e.g., square), or it may be curved, irregular, or otherwise configured to define a co-current flow channel having a geometry desired for liquid delivery to, and gas-liquid contacting within, the co-current flow channel. A V-shaped liquid downcomer, as shown, provides a combination of a large contacting volume between the demisters 24 and liquid downcomer walls 30 in the lower portion of each contacting stage (125 in FIG. 1) and a large liquid downcomer inlet 32 in the upper portion for accommodating enlarged ducts 28 and increasing liquid handling capability.

The liquid downcomer outlet 34 generally has a plurality of slots, perforations, or other types of openings arranged in one or more rows near the bottom of the liquid downcomer 22. The liquid downcomer openings may be located in the walls 30 and/or the bottom of the liquid downcomer 22. In operation, a liquid level in the liquid downcomer 22 provides a seal to prevent the ascending gas from entering the liquid downcomer through the outlets 34. The openings of liquid downcomer outlet 34 are preferably distributed along the length of the liquid downcomer 22 and they may be arranged such that the openings are varied in size or number or eliminated in the portions of the liquid downcomer 22 that are above an inferior liquid downcomer, to help prevent liquid from flowing directly from one liquid downcomer into an inferior liquid downcomer. Demisters 24, used to de-entrain liquid droplets from a gas stream, generally run substantially along the length of liquid downcomer 22 in rows on either side.

As shown in FIG. 2, various optional elements may cooperate with and/or be incorporated into the demister 24 to further improve the performance and/or structural integrity of the overall apparatus. For example, a perforated inlet plate 42 as an inlet surface, a perforated outlet plate 44 as an outlet surface, and an imperforate top plate 45 are shown. Perforated plates are one type of flow manipulator that may cooperate with the demister 24. Other non-limiting examples of flow manipulators for demister 24 include expanded metal, porous solids, mesh pads, screens, grids, mesh, profile wire screens, and honeycombs. It has been found that the fractional open area of the flow manipulators affect both separation efficiency and pressure drop of the demister 24. The fractional open area of the flow manipulators may vary on different sides and on the same side of the demister to optimize the separation efficiency and pressure drop of the demister 24. Various types of flow manipulators may be used in a single demister. In other embodiments, flow manipulators are not used on some or any of the inlet and outlet surfaces of the demister.

The perforated inlet plate 42 or other flow manipulator at an inlet surface of demister 24 is proximate the liquid downcomer 22. The perforated outlet plate 44 is proximate the demister outlet surface, opposite the inlet surface. The perforated outlet plate 44 may also extend along the bottom of demister 24. The imperforate top plate 45 prevents liquid from leaving the demister 24 directly from the top and increases the gas-liquid separation efficiency. The imperforate top plate 45 may have bent strips on both sides, one extending along liquid downcomer wall 30 for attaching with the wall and the other extending along the perforated outlet plate 44 of the demister 24 for connecting with the perforated outlet plate 44. It has been found that extending the imperforate top plate 45 down a distance from the top of the perforated outlet plate 44 also improves gas-liquid separation efficiency. The distance of this extension is generally from about 5% to about 30%, and typically from about 10% to about 20%, of the height of the demister outlet surface.

The plurality of ducts 28 extend through the receiving pan 26 into the liquid downcomer inlet 32. Each of the ducts 28 that extends through a particular receiving pan 26 directs liquid into a different inferior liquid downcomer 22. The top of the ducts 28 may be flush with the horizontal surface of the receiving pan 26 so that liquid may flow freely from the receiving pan 26 into the duct 28 without any obstruction. In other embodiments the ducts 28 may hang from the receiving pan 26 by having a lip that rests on the horizontal surface of the receiving pan when the ducts are fitted through the openings. The ducts 28 may also be mounted to the underside of horizontal surface of the receiving pan 26. Any conventional means of connecting the ducts and receiving pans may be used including but not limited to hanging, bolting, welding, and pressure fitting. Gaskets and/or sealants may be used to prevent leakage between the receiving pans and the ducts. In other embodiments the ducts may be at least partially defined by the portion of the horizontal surface of the receiving pan 26 that may be cut and folded or pushed out to form openings for ducts 28. Further, the top mouths of ducts 28 may be enlarged and wider than liquid downcomer inlets 32 as shown in FIG. 2 to increase liquid handling capability and reduce choking tendency at inlets of ducts 28. The sidewalls of the ducts 28 are sloped so that they fit within the liquid downcomers 22 and leave a gap for easy installation and gas venting, as shown in FIG. 2. The bottom of duct 28 is opened with one or more openings, for example a plurality of spouts or one continuous slot or single larger opening to allow liquid to flow into the liquid downcomer 22. Under normal operating conditions, ducts 28 are sealed against gas flow either dynamically by liquid in the ducts 28 or statically by liquid in the liquid downcomer 22.

The volume between the inlet surface of demister 24, which may be proximate perforated inlet plate 42, as shown in FIG. 2, and the adjacent wall 30 of the liquid downcomer 22 forms a fluid contacting volume or co-current flow channel 56. After co-current flows of gas and liquid are contacted in co-current flow channel 56, fluid contacting continues in demisters 24 before gas and liquid are separated. A perforated inlet plate 42 or other flow manipulator at the inlet surface of demister 24 improves fluid flow distribution through demister 24 and improves gas-liquid separation. Such a flow manipulator may also improve fluid contacting and mass transfer.

The volume above receiving pan 26 and between demister 24 that it supports defines fluid transfer volume 58. The rows of demisters 24 may be oriented at an angle from vertical as illustrated in FIG. 2 to provide improved geometries of co-current flow channels 56, having a decreasing volume from bottom to top (to match decreasing gas flow in this volume) and fluid transfer volume 58, having an increasing volume from bottom to top (to match increasing gas flow in this volume).

The fluid flows through a contacting module 20 of a contacting stage (125 in FIG. 1) include liquid flow from a superior stage that is directed into the liquid downcomer 22 by several receiving pans 26 of a superior stage, in cooperation with ducts 28 of this superior stage. The liquid, which forms a liquid level, exits the liquid downcomer 22 through outlet 34 and enters the co-current flow channel 56. The upward gas velocity is sufficient in co-current flow channel 56 to entrain the entering liquid. The entrained liquid is carried upward by the rising gas to the inlet surfaces of the demisters 24. The gas and liquid are separated by separating structures that provide a tortuous fluid flow path within demisters 24, such that the separated gas exits demister 24 predominantly through its outlet surface (which may be proximate a perforated outlet plate 44, as shown in FIG. 2) into fluid transfer volume 58. The separated gas then continues upward to a co-current flow channel 56 of a superior contacting stage 12. The separated liquid exits the demisters 24 mainly through a bottom portion of the outlet surface and flows onto the receiving pan 26. The receiving pan 26 then directs the separated liquid into the plurality of ducts 28, such that each duct 28 of a given receiving pan directs the liquid into a different inferior liquid downcomer 22. Advantageously, entrainment or fluidization of liquid in co-current flow channel 56, using the representative contacting modules 10 as illustrated in FIG. 2, reduces the adverse performance effects of swaying (e.g., on an offshore platform) or other movement of vapor-liquid contacting apparatus 10. Moreover, non-uniform or other undesirable flow patterns of liquid in downcomer 22, due to such movement of apparatus 10, can be effectively limited by using one or more baffles (not shown) within liquid downcomer 22.

Representative methods for contacting a gas and a liquid, for example in the absorption of impurities in gas into a liquid absorbent, therefore comprise (a) feeding an impure gas, through gas feed inlet 102, to a lower section of primary absorption zone 100 and (b) feeding a fresh absorbent, through liquid feed inlet 104, to an upper section of a secondary absorption zone 200. As discussed above, the impure gas and absorbent are contacted in a counter-current manner in both primary and secondary absorption zones 100, 200 (i.e., such that the overall flow of vapor is upward and the overall flow of liquid is downward in these absorption zones). Advantageously, the secondary absorption zone 200 is disposed below the primary absorption zone 100. Representative methods may therefore comprise feeding the impure gas and fresh absorbent into the gas feed inlet 102 and liquid feed inlet 104, respectively, of the vapor-liquid contacting apparatus 10 depicted in FIG. 1.

A representative impure gas comprises predominantly light hydrocarbons (e.g., $C_1$-$C_3$ hydrocarbons such as methane), and non-hydrocarbon gas contaminants, such as carbon dioxide ($CO_2$) and hydrogen sulfide ($H_2S$). Examples of such gas streams include natural gas and coalbed methane, which comprise predominantly methane (e.g., in an amount generally greater than about 50% by volume, typically greater than about 80% by volume, and often greater than about 90% by volume) and also comprise the acid gases $CO_2$ and $H_2S$ in a combined amount from about 1% to about 10% by volume. Due to the highly efficient contacting, and particularly in the secondary absorption zone 200 at a lower elevation, the reduction in selectively absorbed (reacted or dissolved) contaminants in the purified gas exiting the vapor-liquid contacting apparatus, through the gas product outlet 106, can be substantial. For example, the combined amount of acid gases $CO_2$ and $H_2S$ in the purified gas, after having been passed through both primary and secondary absorption zones 100, 200, may be generally less than about 1000 ppm, typically less than about 100 ppm, and often less than about 50 ppm, by volume. It will be appreciated that the invention is broadly applicable to the purification of impure gas feeds in which a contaminant, present in a minor amount, is preferentially absorbed into a liquid absorbent or solvent, and particularly a chemical solvent.

A representative liquid feed is a fresh absorbent or solvent, which may include make up and/or recycled absorbent, as discussed above. Examples of absorbents that are particularly effective as chemical solvents for removing acid gases include organic amines and particularly alkanolamines (e.g., monoethanolamine (MEA), methyldiethanolamine (MDEA), and diethanolamine (DEA)). In an exemplary embodiment, the impure gas and fresh absorbent are fed, respectively, to a lower section (e.g., a bottom contacting stage) of the primary absorption zone 100 and an upper section (e.g., a top contacting stage) of the secondary absorption zone 200 for overall counter-current contacting, in both of these zones, of rising vapor against falling liquid. Downward liquid flow induced, for example, by gravity may be a trickle flow within primary and secondary absorption zones 100, 200. A purified gas is removed through gas product outlet 106 from an upper section (e.g., a top contacting stage) of the secondary absorption zone, and spent absorbent is removed through liquid product outlet 108 from a lower section (e.g., a bottom contacting stage) of the primary absorption zone 100.

Other process features associated with the embodiment of a vapor-liquid contacting apparatus 10 shown in FIG. 1 include flowing, through primary absorption zone vapor outlet 110, a primary absorption zone vapor effluent from an upper section (e.g., a top contacting stage) of primary absorption zone 100 and then passing this primary absorption zone vapor effluent through secondary absorption zone vapor inlet 114 to a lower section (e.g., a bottom contacting stage) of secondary absorption zone 200. Further process features include flowing, through secondary absorption zone liquid outlet 112, a secondary absorption zone liquid effluent from the lower section (e.g., the bottom contacting stage) of secondary absorption zone 200 and then passing this secondary absorption zone liquid effluent through primary absorption zone liquid inlet 116 to the upper section (e.g., the top contacting stage) of primary absorption zone 100. Pumping or conveying of the liquid effluent from secondary absorption zone 200 to primary absorption zone 100 may be aided using absorbent liquid pump 250, and cooling of this liquid effluent prior to primary absorption zone 100 may be achieved using heat exchanger 300.

A number of variations of vapor-liquid contacting methods utilizing a secondary absorption zone (or finishing zone) disposed below a primary absorption zone are within the scope of the present invention and will be recognized by those skilled in the art, having knowledge of the present disclosure. For example, the primary and/or secondary absorption zone(s) may be operated as co-current contacting zones, with overall vapor and liquid flows in the same direction (i.e., either both upward or both downward), rather than as counter-current contacting zones. According to other alternative embodiments, a flow of fresh absorbent or solvent, as a liquid feed, may be split between the primary and secondary absorption zones, such that the zones operate in parallel with respect to the liquid phase and in series with respect to the vapor phase. Further embodiments include those utilizing gas recompression following the primary absorption zone to more efficiently drive the operation in the secondary absorption zone (e.g., by inducing greater turbulence to improve mixing). Still further alternative embodiments can include a step of flashing the partially spent absorbent after exiting the secondary absorption zone and before entering the primary absorption zone. Combinations of these variations are also possible.

Overall, aspects of the invention are directed to vapor-liquid contacting apparatuses comprising a primary contacting (e.g., absorption) zone comprising a plurality of contacting stages and a secondary contacting (e.g., absorption) zone disposed below the primary contacting zone. The apparatuses are especially advantageous over conventional vapor-liquid contacting apparatuses in offshore applications such as on floating vessels or platforms that are subject to rocking. Those having skill in the art will recognize the advantages of the apparatuses and associated methods described herein and their suitability in other applications. In view of the present disclosure, it will be appreciated that other advantageous results may be obtained. Those having skill in the art, with the knowledge gained from the present disclosure, will recognize that various changes can be made in the above apparatuses and methods without departing from the scope of the present disclosure.

The invention claimed is:
1. A vapor-liquid contacting apparatus comprising:
 (a) a primary absorption zone, and
 (b) a secondary absorption zone disposed below the primary absorption zone; and
wherein a gas feed inlet to the apparatus and a liquid product outlet from the apparatus both communicate with a lower section of the primary absorption zone and a liquid feed inlet to the apparatus and a gas product outlet from the apparatus both communicate with an upper section of the secondary absorption zone.

2. The vapor-liquid contacting apparatus of claim 1, wherein a vapor outlet from the primary absorption zone and a liquid outlet from the secondary absorption zone each communicate with both an upper section of the primary absorption zone and a lower section of the secondary absorption zone.

3. The vapor-liquid contacting apparatus of claim 1, wherein the secondary absorption zone comprises packing material or a plurality of trays.

4. The vapor-liquid contacting apparatus of claim 2, wherein the primary absorption zone comprises a plurality of vapor-liquid co-current contacting stages.

5. The vapor-liquid contacting apparatus of claim 4, wherein the gas feed inlet to the apparatus and the liquid product outlet from the apparatus both communicate with a bottom contacting stage of the primary absorption zone and a vapor outlet from the primary absorption zone and the liquid outlet from the secondary absorption zone both communicate with a top contacting stage of the primary absorption zone.

6. The vapor-liquid contacting apparatus of claim 4, wherein the vapor-liquid co-current contacting stages have at least one contacting module comprising a liquid downcomer having an outlet proximate at least one co-current flow channel.

7. The vapor-liquid contacting apparatus of claim 6, wherein the apparatus is installed offshore.

* * * * *